(12) United States Patent
Han et al.

(10) Patent No.: US 10,064,064 B2
(45) Date of Patent: Aug. 28, 2018

(54) LTE-U COMMUNICATION DEVICES AND METHODS FOR APERIODIC BEACON AND REFERENCE SIGNAL TRANSMISSION

(71) Applicant: Intel IP Corporation, Santa Clara, CA (US)

(72) Inventors: Seunghee Han, Cupertino, CA (US); Shafi Bashar, Santa Clara, CA (US); Huaning Niu, Milpitas, CA (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 140 days.

(21) Appl. No.: 14/669,366

(22) Filed: Mar. 26, 2015

(65) Prior Publication Data

US 2015/0373674 A1 Dec. 24, 2015

Related U.S. Application Data (60) Provisional application No. 62/016,001, filed on Jun. 23, 2014.

(51) Int. Cl.
*H04W 16/14* (2009.01)
*H04L 5/00* (2006.01)
(Continued)

(52) U.S. Cl.
CPC .............. *H04W 16/14* (2013.01); *H04L 5/00* (2013.01); *H04W 72/1289* (2013.01); *H04W 72/1215* (2013.01); *H04W 84/042* (2013.01)

(58) Field of Classification Search
CPC ............. H04W 16/14; H04W 72/1289; H04W 72/1215; H04W 84/042
See application file for complete search history.

(56) References Cited

U.S. PATENT DOCUMENTS

2013/0028229 A1* 1/2013 Suh ...................... H04W 48/08
370/329
2014/0003653 A1 1/2014 Walker et al.
(Continued)

FOREIGN PATENT DOCUMENTS

CN 101877865 A 11/2010
JP 2011172237 A 9/2011
(Continued)

OTHER PUBLICATIONS

"International Application Serial No. PCT/US2015/034141, International Search Report dated Sep. 15, 2015", 3 pgs.
(Continued)

*Primary Examiner* — Jackie Zuniga Abad
(74) *Attorney, Agent, or Firm* — Schwegman Lundberg & Woessner, P.A.

(57) ABSTRACT

An enhanced NodeB (eNB), user equipment (UE) and method of communicating using Long Term Evolution (LTE) licensed and unlicensed bands are generally described herein. The eNB may transmit a trigger signal to the UE. The trigger signal may be transmitted in the LTE unlicensed or licensed band and inform the UE of transmission of a reference signal from the eNB to the UE in the unlicensed band. The trigger signal may correspond to a single reference signal transmission or multiple periodic or consecutive reference signal transmissions. The trigger signal or a separate trigger signal may be used to inform the UE of a data transmission. The trigger signal may be transmitted at any point prior to or in the same subframe as the reference signal and the reference signal may be transmitted before, after or in the same subframe as the data.

27 Claims, 5 Drawing Sheets

(51) Int. Cl.
*H04W 72/12* (2009.01)
*H04W 84/04* (2009.01)

(56) References Cited

U.S. PATENT DOCUMENTS

| 2014/0036853 A1* | 2/2014 | Kim | H04W 16/14 |
| | | | 370/329 |
| 2014/0036881 A1* | 2/2014 | Kim | H04L 5/001 |
| | | | 370/336 |

FOREIGN PATENT DOCUMENTS

| JP | 2013520084 A | 5/2013 | | |
| JP | 2014500685 A | 1/2014 | | |
| JP | 2014524696 A | 9/2014 | | |
| KR | 1020160147907 A | 12/2016 | | |
| WO | WO 2012078565 A1 * | 6/2012 | | H04L 5/001 |
| WO | WO-2012078565 A1 | 6/2012 | | |
| WO | WO-2012086039 A1 | 6/2012 | | |
| WO | WO-2013006988 A1 | 1/2013 | | |
| WO | WO-2013023363 A1 | 2/2013 | | |
| WO | WO-2013059999 A1 | 5/2013 | | |
| WO | WO-2015199932 A1 | 12/2015 | | |

OTHER PUBLICATIONS

"International Application Serial No. PCT/US2015/034141, Written Opinion dated Sep. 15, 2015", 8 pgs.

"European Application Serial No. 15812822.3, Extended European Search Report dated Jan. 11, 2018", 16 pgs.

"Japanese Application Serial No. 2016-569393, Office Action dated Dec. 19, 2017", (English Translation), 12 pgs.

"Korean Application Serial No. 10-2016-7032782, Notice of Preliminary Rejection dated Dec. 20, 2017", With English Translation, 18 pgs.

"Views on Detail Design of Dynamic Aperiodic SRS", 3GPP TSG-RAN WG1#61, 3GPP, May 14, 2010, R1-102978, [Online]. Retrieved from the Internet: <URL:http://www.3gpp.org/ftp/tsg_ran/WG1_RL1/TSGR1_61/Docs/R1-102978.zip>, (Dec. 8, 2017).

"Chinese Application Serial No. 201580026278,9, Office Action dated May 21, 2018", w/ English translation, 35 pgs.

"Japanese Application Serial No. 2016-569393, Office Action dated Apr. 17, 2018", w/ English translation, 10 pgs.

* cited by examiner

FIG. 4B ively, due to the nature of transmissions in the unlicensed band in contrast with the ordered transmissions in a licensed band, some of the periodic messages may not reach the intended UEs.

LTE-U COMMUNICATION DEVICES AND METHODS FOR APERIODIC BEACON AND REFERENCE SIGNAL TRANSMISSION

PRIORITY CLAIM

This application claims the benefit of priority to U.S. Provisional Patent Application Ser. No. 62/016,001, filed Jun. 23, 2014, which is incorporated herein by reference in its entirety.

TECHNICAL FIELD

Embodiments pertain to radio access networks. Some embodiments relate to communicating scheduling information for both licensed and unlicensed spectrums.

BACKGROUND

Long Term Evolution (LTE) networks operate in a number of specific frequency bands and deliver a wide variety of information to an ever-increasing number and type of user equipment (UE). Typically, the use of different communication techniques is limited to licensed bands regulated by the federal government. The growth of network use has sparked an interest in expanding LTE use beyond these licensed bands. LTE-Unlicensed (LTE-U) allows UEs to make use of unlicensed spectrum in communications. Other networks, such as WiFi and Bluetooth, coexist with LTE-U in the unlicensed spectrum. This presents a problem as periodic reference signaling messages occur between the LTE network and UEs. The reference signaling messages may include a cell-specific reference signal (CRS), which is used for scheduling transmissions to multiple UEs and for channel estimation used in coherent demodulation at the UE. The reference signaling messages may include a Channel Quality Indication (CQI) indicating a measurement of the channel quality, a channel state information reference signal (CSI-RS) used for measurement purposes, and a Discovery Reference Signal (DRS) specific to an individual UE. These and other periodic messages thus not only provide information regarding the communication channel, but also enable tracking in time and/or frequency of communications with the UE. These periodic messages may cause issues in communications between WiFi and Bluetooth devices and/or cause additional interference in the communications between the WiFi and Bluetooth devices. Moreover, due to the nature of transmissions in the unlicensed band in contrast with the ordered transmissions in a licensed band, some of the periodic messages may not reach the intended UEs.

It would therefore be desirable to provide an efficient signaling mechanism for LTE-U devices while minimizing disturbances to other devices operating in the same unlicensed spectrum.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
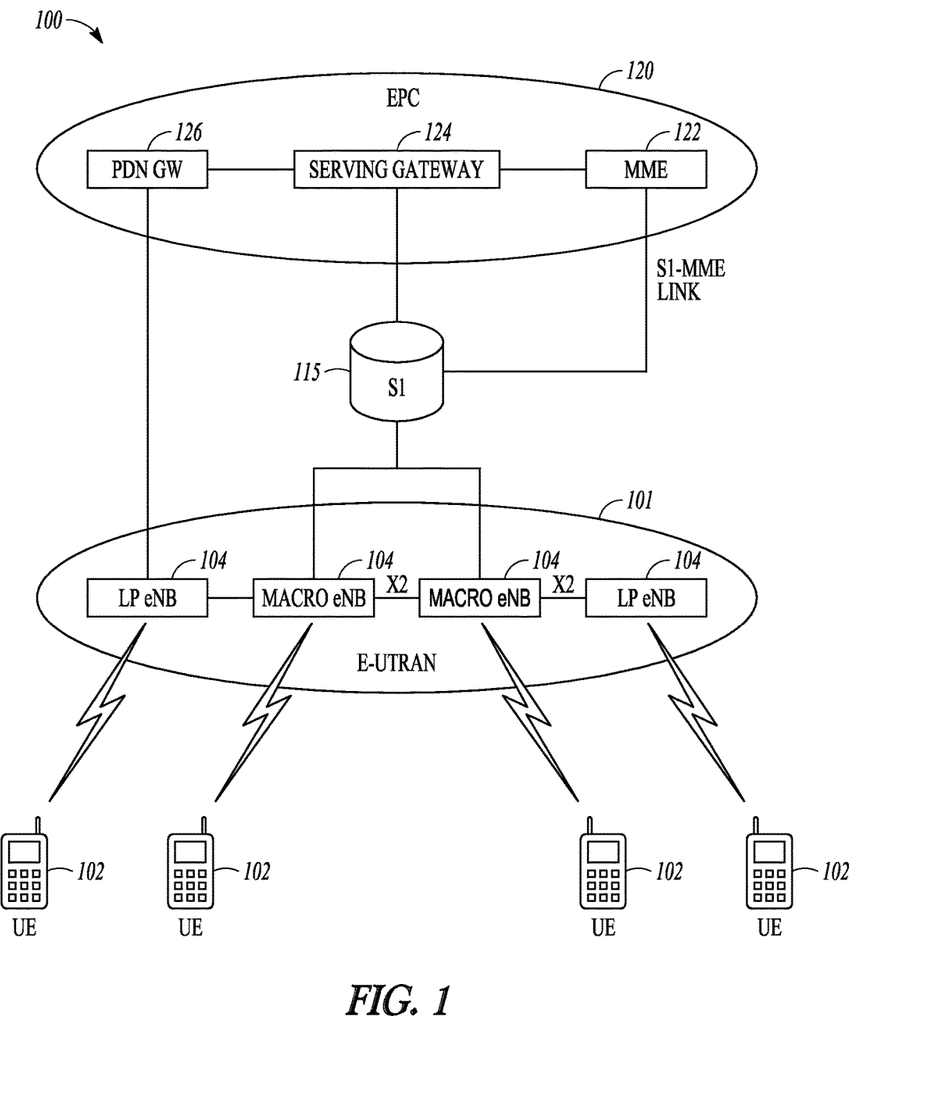
FIG. 1 shows an example of a portion of an end-to-end network architecture of an LTE network with various components of the network in accordance with some embodiments.

FIG. 1 shows an example of a portion of an end-to-end network architecture of a long term evolution (LTE) network with various components of the network in accordance with some embodiments. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 may include mobility management entity (MME) 122, serving gateway (serving GW) 124, and packet data network gateway (PDN GW) 126. The RAN 101 includes evolved node Bs (eNBs) 104 (which may operate as base stations) for communicating with user equipment (UE) 102. The eNBs 104 may include macro eNBs and low power (LP) eNBs.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN may be any kind of IP network, as well as an IP Multimedia Subsystem (IMS) domain. The PDN GW 126 and the serving GW 124 may be implemented in a single physical node or separate physical nodes.

The PDN GW 126 and MME 122 may also be connected to a location server 130. The UE and eNB may communicate with the location server 130 via the user plane (U-Plane) and/or control plane (C-Plane). The location server 130 may be a physical or logical entity that may collect measurement data and other location information from the UE 102 and eNB 104 and assist the UE 102 with an estimation of the position of the UE 102, providing a calculation of the network-based location, as indicated in more detail below.

The eNBs 104 (macro and micro) may terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, such as the LTE unlicensed band, or may operate on different frequency bands with each cell operating in a different frequency band or only cells of different sizes operating on different frequency bands. As used herein, the term low power (LP) eNB refers to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally may connect to the user's broadband line. The femtocell may connect to the mobile operator's mobile network and provide extra coverage in a range of typically 30 to 50 meters. Thus, a LP eNB may be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network is split up into 10 ms frames, each of which contains ten 1 ms subframes. Each subframe, in turn, may contain two slots of 0.5 ms. Each slot may contain 6-7 symbols, depending on the system used. A resource block (RB) may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and multiplexed in the time domain. A downlink resource grid may be used for downlink transmissions from an eNB to a UE. The grid may be a time-frequency grid, which is the physical resource in the downlink in each slot. Each column and each row of the resource grid may correspond to one OFDM symbol and one OFDM subcarrier, respectively. The duration of the resource grid in the time domain may correspond to one slot. The smallest time-frequency unit in a resource grid may be denoted as a resource element. Each resource grid may comprise a number of the above resource blocks, which describe the mapping of certain physical channels to resource elements. Each resource block may comprise 12 (subcarriers)*14 (symbols)=168 resource elements.

There are several different physical downlink channels that may be conveyed using such resource blocks. Two of these physical downlink channels may be the physical down link control channel (PDCCH) and the physical downlink shared channel (PDSCH). Each subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher-layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 2:
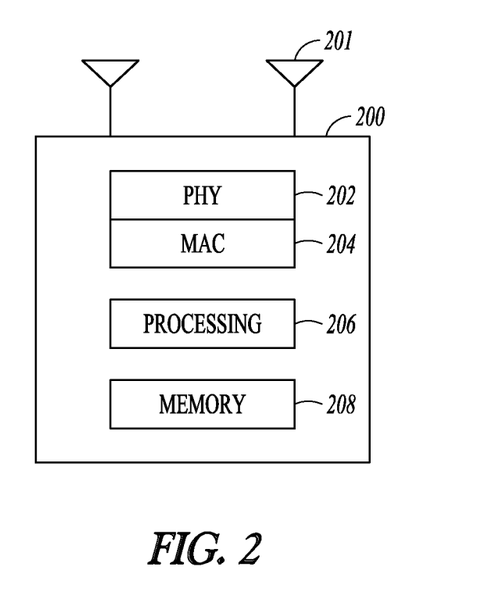
FIG. 2 illustrates a functional block diagram of an eNB in accordance with some embodiments in accordance with some embodiments.

FIG. 2 illustrates a functional block diagram of a communication device in accordance with some embodiments. The communication device 200 may be an UE or eNB and may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. The communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $\frac{1}{10}$ of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a Long-Term-Evolution (LTE) communication network or an LTE-Advanced communication network or a fifth generation (5G) LTE communication network or a high speed downlink/uplink access (HSDPA/HSUPA) communication network, although the scope of the invention is not limited in this respect.

Figure 3:
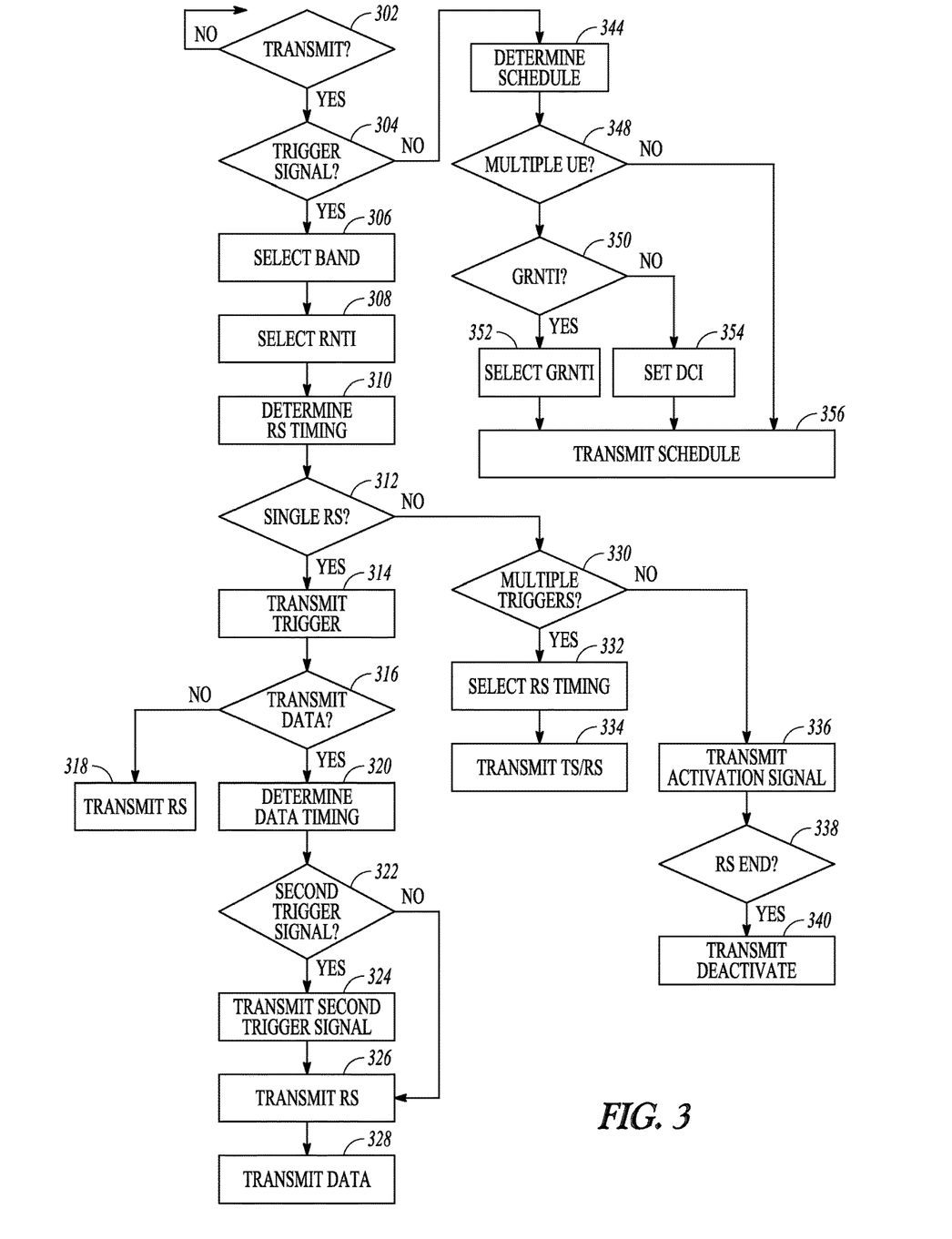
FIG. 3 illustrates a flowchart of a method of eNB transmitting an aperiodic beacon signal in accordance with some embodiments.

FIG. 3 illustrates a flowchart of a method of eNB transmitting an aperiodic beacon signal in accordance with some embodiments. The aperiodic beacon signal (also referred to herein as a trigger signal) may be transmitted in the licensed or unlicensed band while the aperiodic reference signal indicated by the aperiodic beacon signal may be transmitted in the unlicensed band. The aperiodic reference signal indicated by the aperiodic beacon signal may be transmitted in addition to typical periodically transmitted reference signals (which may be transmitted periodically up to several hundred ms apart). In other embodiments, the aperiodic reference signal indicated by the aperiodic beacon signal may be transmitted instead of the periodically transmitted reference signals. In various embodiments, the timing of the various steps may be adjusted, and some of the steps shown may not be present. The aperiodic reference signal may include at least one of a cell-specific reference signal (CRS), a Channel Quality Indication (CQI), a channel state information reference signal (CSI-RS), and a Discovery Reference Signal (DRS). The CRS may be used by the UE for cell search and initial acquisition of communication with the eNB, downlink channel quality measurements and downlink channel estimation for coherent demodulation or detection. The CQI may provide the eNB with channel quality information including carrier level received signal strength indication (RSSI) and bit error rate (BER). The CSI-RS may be used to estimate the channel and report channel quality information. The DRS may include one or more of the above signals and may be specific to an individual UE.

In step 302, the eNB may determine whether transmission of a signal to one or more particular UEs is desired. For example, the eNB may detect or request information from the UE or other communication devices whether any WiFi device is currently transmitting in the unlicensed band. In one embodiment, only if eNB decides that the carrier is free, may the eNB decide to transmit the trigger signal. Note that the carrier in the licensed band may be either the primary cell, in which the UE may perform the initial RRC connection establishment procedure (or initiates a re-establishment procedure), or the carrier in the licensed band may be the secondary cell, which may provide additional resources and may be configured after the RRC connection procedure is performed using the primary cell. The primary cell, for example, may be in the licensed band, while the secondary cell may be in the unlicensed band.

If the eNB determines that transmission of the trigger signal is desired, the eNB may determine whether the transmission is to be a trigger signal (also referred to as an aperiodic beacon) at step 304. The trigger signal may indicate to the UE that a reference signal is to be transmitted on the unlicensed band. The trigger signal may be sent on the primary cell in a Physical Downlink Control Channel (PDCCH), Enhanced Physical Downlink Control Channel (EPDCCH), Media Access Control Control Element (MAC- CE), or a Radio Resource Control (RRC) message. The EPDCCH, like the PDCCH, may be UE-specific and use PDSCH resources for transmission of control information. The EPDCCH may be configured via RRC signaling. Each UE can be configured with two sets of EPDCCHs, whose configurations can differ between sets. For example, one or more bits of the PDCCH or EPDCCH may be used as the trigger signal.

If the eNB determines that the transmission is to be a trigger signal at step 304, at step 306, the eNB may determine the manner in which the trigger signal is to be sent to the UE. In one embodiment, the eNB may decide between sending the trigger signal to the UE via the LTE licensed band and via the unlicensed band (independent of transmission of the reference signal, which will be sent via the unlicensed band).

In addition, the eNB may at step 308 select a particular RNTI for the UE. As above, rather than using bits in the PDCCH, a new RNTI may be used. In one embodiment, a Random Access RNTI (typically used in the Physical Random Access Channel (PRACH) Response) may be used to scramble the PDCCH or EPDCCH. In this case, the PDCCH or EPDCCH may subsequently be transmitted on the common search space to permit the UE (which has to search the common search space) to find the PDCCH or EPDCCH. This may also permit multiple UEs, able to unscramble the PDCCH or EPDCCH, to receive the triggering message.

The eNB may also determine at step 310 the timing between transmission of the trigger signal and transmission of the reference signal. This timing may indicate the difference in subframes between transmission of the trigger signal and transmission of the reference signal. The timing can take any value, i.e., the trigger signal and reference signal may be transmitted in the same subframe or in different subframes. In some embodiments, the trigger signal may be transmitted prior to the reference signal. In other embodiments, the trigger signal may be transmitted in the same subframe as the reference signal. Allowing the reference signal to be triggered by a trigger signal at least one subframe earlier may help the UE to prepare to receive the reference signal in the carrier in the unlicensed band. For instance, PDCCH decoding time takes typically up to about 1 ms. This means that at least a 1 ms margin is desirable to enable a UE to receive the trigger signal in the PDCCH, decode it and prepare for receiving the reference signal in the carrier in unlicensed band. Additionally, the typical processing time for a PDSCH is 3 ms. If MAC-CE/RRC based triggering is applied, at least a 3 ms margin is desirable. Thus, it may be desirable for the eNB to set a delay of 4 subframes between transmission of the trigger signal and the reference signal to allow for both the processing time to obtain the date in the PDSCH as well as provide the typical acknowledgement in a PUCCH, which typically takes a subframe. Note that the times described above are typical and the scope of the embodiments is not limited in this respect.

The eNB next may determine at step 312 whether a single reference signal is to be transmitted. This is to say that, in various embodiments, the eNB may determine whether a single reference signal is to be transmitted or whether multiple reference signals are to be transmitted. Depending on the embodiment, each of the reference signals may have a corresponding trigger signal or multiple reference signals may correspond to a single trigger signal.

If eNB determines that a single reference signal is to be transmitted, the eNB transmits the trigger signal at step 314. In one embodiment, the eNB may transmit the trigger signal at the time it determines that a single trigger signal is to be transmitted. In another embodiment, the eNB may delay transmission of the trigger signal for at least one subframe. The timing between transmission of the trigger and reference signals, as well as the frequency band on which the trigger signal is transmitted may vary, as determined by the eNB. In one embodiment, the trigger signal may be aperiodic and unscheduled.

As above, transmission of the trigger signal may be in the licensed or unlicensed band. At step 316, the eNB subsequently may determine whether data, in addition to a reference signal, is to be transmitted to the UE. The number of trigger signals may vary dependent as determined by the eNB.

If the eNB decides that data is not to be transmitted, the reference signal may be transmitted to the UE on a carrier of the unlicensed band at step 318. In one embodiment, the reference signal may be transmitted on the same band (e.g., the unlicensed band) as the trigger signal. In another embodiment, the reference signal may be transmitted on another band (e.g., the licensed band) as the trigger signal. In one embodiment, the reference signal may be transmitted in the same subframe as the trigger signal. In one embodiment, the reference signal may be transmitted in a subsequent subframe as the trigger signal.

In one embodiment, the eNB may determine that a data signal containing data for the UE is to be transmitted to the UE. In this embodiment, at step 320 the eNB may determine the timing of when the data signal is to be transmitted. The timing between transmission of the reference signal and data signal may vary dependent as determined by the eNB.

At step 322, the eNB may determine whether a separate trigger signal or scheduling information is to be transmitted to the UE. In one embodiment, the separate trigger signal may be employed to inform the UE of the data transmission. In another embodiment, the same trigger signal that may inform the UE of the reference signal transmission may also inform the UE of the data transmission.

If the eNB determines that a separate trigger signal or scheduling information is to be transmitted to the UE, at step 324, the eNB transmits the separate trigger signal to the UE to inform the UE of the data transmission. The timing between transmission of the trigger signal, transmission of the separate trigger signal, transmission of the reference signal, and data signal (and between the reference signal and data signal) may vary independently as determined by the eNB. In one embodiment, the trigger signals may be transmitted in the same subframe. In one embodiment, the trigger signals may be transmitted in different subframes. If the trigger signals are transmitted in different subframes, in one embodiment the trigger signal indicating transmission of the reference signal may be transmitted prior to the trigger signal indicating transmission of the data signal. Alternatively, in one embodiment the trigger signal indicating transmission of the data signal may be transmitted prior to the trigger signal indicating transmission of the reference signal. In one embodiment, either or both trigger signals may be aperiodic and unscheduled.

Regardless of whether another trigger signal is sent to the UE, at step 326, the eNB may transmit the reference signal at the time determined by the eNB. In one embodiment, timing of transmission of the reference signal may be indicated in the trigger signal. The reference signal may be transmitted at an aperiodic time. That is, in one embodiment, the reference signal may be transmitted at a time that is different from scheduled periodic reference signal transmissions from the eNB in the licensed band. In one embodiment, the reference signal may be transmitted in the same subframe and at the same time as scheduled periodic reference signal transmissions from the eNB in the licensed band. The reference signal may include at least one of a cell-specific reference signal (CRS), a Channel Quality Indication (CQI), a channel state information reference signal (CSI-RS), and a Discovery Reference Signal (DRS). In one embodiment, an aperiodic reference signal transmitted in the unlicensed band may differ from a reference signal transmitted in the licensed band, even if transmitted by the eNB in the same subframe.

At step 328, the eNB may send the data signal to the UE at the determined time. In one embodiment, the data signal may be transmitted in the same subframe as the reference signal. In one embodiment, the data signal and the reference signal may be transmitted in different subframes. If the data signal and the reference signal are transmitted in different subframes, in one embodiment the data signal may be transmitted prior to the reference signal. Alternatively, in one embodiment the reference signal may be transmitted prior to the data signal. The timing of transmission may be independent of the timing of transmission of the trigger signals. That is, in one embodiment, although the trigger signal indicating transmission of the reference signal is transmitted prior to the trigger signal indicating transmission of the data signal, the data signal may be transmitted prior to the reference signal. In another embodiment, although the trigger signal indicating transmission of the data signal is transmitted prior to the trigger signal indicating transmission of the reference signal, the reference signal may be transmitted prior to the data signal. In one embodiment, the trigger signal indicating transmission of the reference signal may be transmitted prior to the trigger signal indicating transmission of the data signal, and the reference signal may be transmitted prior to the data signal. In one embodiment, the trigger signal indicating transmission of the data signal may be transmitted prior to the trigger signal indicating transmission of the reference signal, and the data signal may be transmitted prior to the reference signal. Thus, the order in which the trigger signals are sent may be different from the order in which the reference signal and data signal are sent.

Figure 4A:
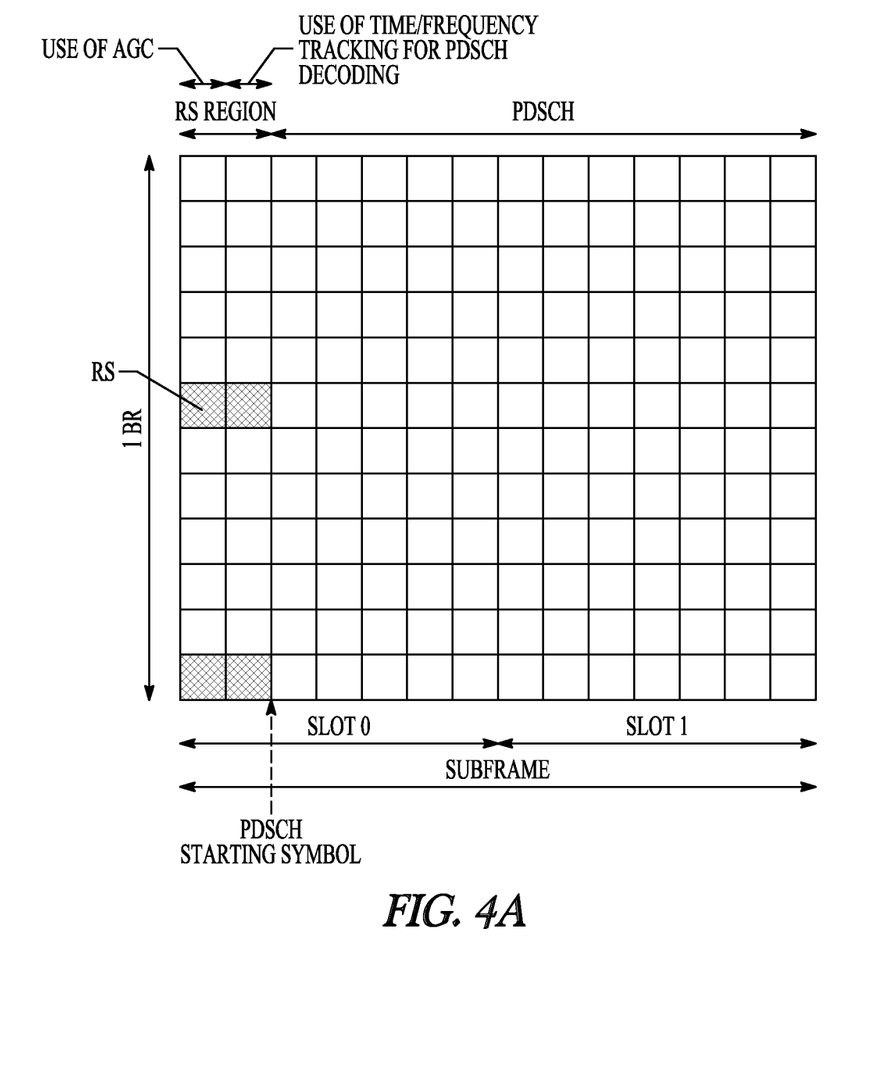
FIGS. 4A and 4B illustrate resource blocks in accordance with some embodiments.
Figure 4B:
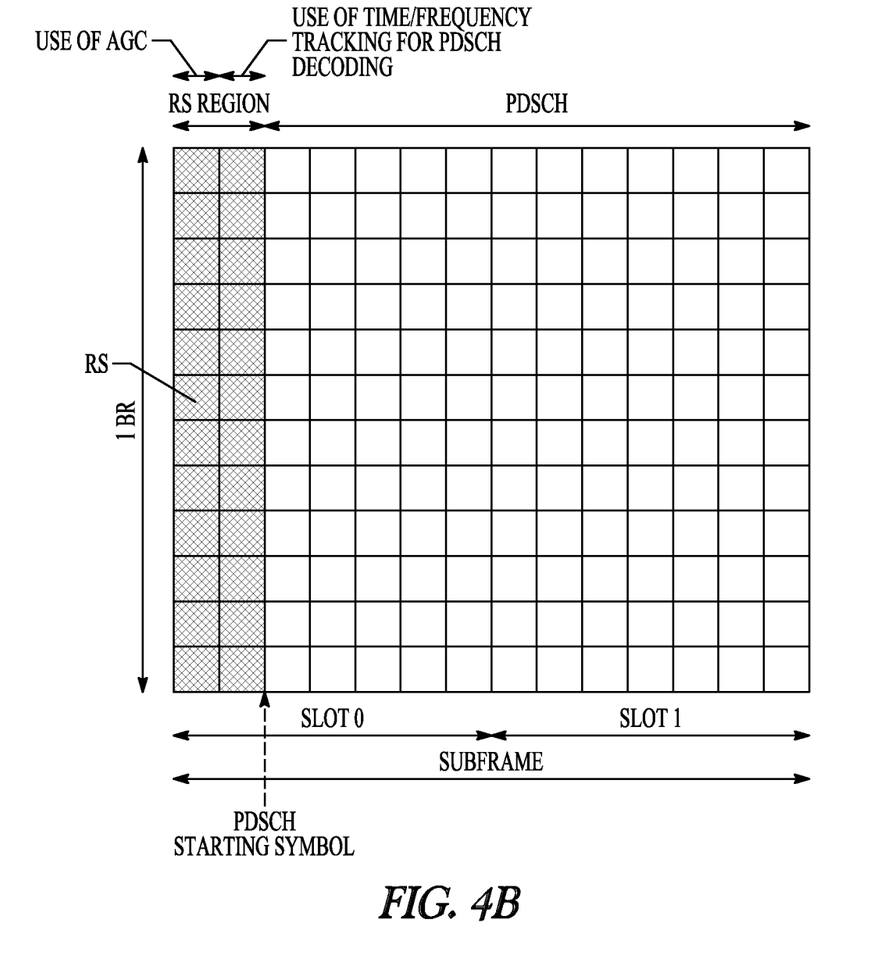

FIGS. 4A and 4B illustrate resource blocks in accordance with some embodiments. As shown, in one embodiment, the reference signal may occupy the first two OFDM symbols in a subframe. In general, the first OFDM symbol in each subfrequency in the resource block may be used by the UE for automatic gain control (AGC) of the received signal, while the second OFDM symbol aids in time/frequency synchronization before data decoding. This may allow the starting symbol of the PDSCH to be defined so that data is not lost during operation of the AGC of the UE. The reference signal may be transmitted in the PDCCH in a particular resource block of a particular subframe only by one or two carrier subfrequencies (of the 12 available), as shown in FIG. 4A, or may be carried by all subfrequencies, as shown in FIG. 4B. In one embodiment, if two carrier subfrequencies are used to carry the reference signal, the carrier subfrequencies may be separated by the maximum number of carrier subfrequencies, e.g., the $6^{th}$ and $12^{th}$ carrier subfrequencies. As above data triggering and reference signal trigger may be transmitted at any time relative to each other. For example, although FIG. 3 shows that the trigger signal for the reference signal is transmitted prior to the trigger signal/scheduling information for the data transmission, in other embodiments, the data signal may be scheduled for the UE prior to the trigger signal for the reference signal being transmitted by the eNB and may be separated by one or more subframes. Moreover, transmission of the reference signal and the data signal may occur in any order and thus the relative timing of the transmission of the reference signal and data signal may be independent of the relative timing of the transmission of the trigger signals for the reference signal and data. In various embodiments, the reference signal and data signal may be transmitted in the same subframe or may be transmitted in different subframes.

If, at step 312, the eNB determines that more than one reference signal is to be sent to the UE, at step 330, the eNB may determine whether multiple trigger signals are associated with the reference signals. Thus, in one embodiment, a single trigger signal may serve to indicate to the UE of the transmission of multiple reference signals. In another embodiment, transmission of each reference signal may be indicated by a different trigger signal. In one embodiment, multiple trigger signals may be provided, each indicating one or more reference signals.

If the eNB determines that more than one reference signal is to be sent to the UE, the eNB at step 332 may select the timing for each reference signal. In one embodiment, the reference signals may be transmitted to the UE in the same unlicensed band. In one embodiment, one of the reference signals may be transmitted to the UE in the unlicensed band while another of the reference signals may be transmitted to the UE in the licensed band. In one embodiment, the reference signals may be transmitted in consecutive subframes. In one embodiment, the reference signals may be transmitted in non-continuous subframes.

At step 334, the eNB transmits the trigger signals and reference signals with the individual determined timings. In one embodiment, each trigger signal may correspond to a different reference signal transmission and thus each trigger signal has an associated reference signal. In other embodiments, the eNB may transmit to the UE a mix of two or more trigger signals of which a trigger signal corresponds to transmission of a signal reference signal and a trigger signal corresponds to transmission of multiple reference signals. The timing between transmission of the trigger signals and transmission of the reference signals may vary as determined by the eNB. In one embodiment, at least one of the trigger signals may be transmitted in the same subframe as at least one of the reference signals. For example, in one embodiment, at least one trigger signal and corresponding reference signal may be transmitted in the same subframe, while at least one other trigger signal and corresponding reference signal may be transmitted in different subframes. Alternatively, in one embodiment the trigger signals and reference signals are transmitted in non-overlapping subframes.

If at step 330 the eNB determines that a single trigger signal is associated with multiple reference signals, at step 336 the eNB may transmit a single activation message to the UE to indicate transmission of a first reference signal of the multiple reference signals. The reference signals may then be transmitted in consecutive subframes or in non-consecutive subframes. For example, the reference signals may be transmitted periodically (e.g., every n subframes). In another embodiment, sets of the reference signals may be transmitted periodically (e.g., x reference signals over x consecutive subframes every n subframes). In one embodiment, no activation message is transmitted, with the trigger signal indicating the number and timing of reference signals.

At step 338, the eNB determines whether the final reference signal has been transmitted. The number of reference signals transmitted may be predetermined for each transmission or set for a particular set of reference signals and indicated by the trigger signal.

At step 340, the eNB transmit a deactivation message to the UE to indicate that the final reference signal has been transmitted. In one embodiment, no deactivation message is transmitted, as above with the trigger signal indicating the number and timing of reference signals.

In addition, the eNB may determine at step 322 that a separate trigger signal may not be sent to indicate transmission of the data signal. This is to say that the trigger signal transmitted at step 314 may serve to indicate transmission of both the reference signal and the data signal. As above, transmission of the reference signal and the data may occur in any order and thus the relative timing of the transmission of the reference signal and data signal may be independent of the relative timing of the transmission of the trigger signals for the reference signal and the data signal. In various embodiments, the reference signal and data may be transmitted in the same subframe or may be transmitted in different subframes.

If, in step 304, the eNB may determine that a trigger signal is not to be transmitted, the data signal may instead be scheduled on the unlicensed band at step 344. In one embodiment, the data signal may be scheduled to be aperiodic with other signals scheduled on the licensed band.

At step 348, the eNB may determine whether data signals to multiple UEs should be scheduled. If the eNB determines that data signals to multiple UEs should not be scheduled, the eNB may determine that only a data signal (or multiple data signals) to only one UE is to be scheduled.

At step 356, the eNB may transmit the data signal schedule to the UE on the unlicensed band. In this case, the eNB may transmit the data signal to the UE on the unlicensed band separately. Alternately, the eNB may transmit the data signal to the UE without sending a separate schedule.

At step 348, the eNB may determine that data signals to multiple UEs should be scheduled. However, certain issues may occur if the eNB transmits to multiple UEs on the unlicensed band. Due to the opportunistic nature of transmission on the unlicensed band and control of the transmission medium on the licensed band, use of the licensed band is preferable to transmit control channel transmissions such as scheduling information, while the data transmission is provided over the unlicensed band. This means that the licensed band may wind up scheduling data transmissions for multiple bands. To reduce the problem of increased control channel overhead in the licensed band as well as PDCCH blocking (i.e., UEs not searching the correct carrier for the control information), group scheduling of multiple UEs or multiple resource blocks may be performed using a single PDCCH or EPDCCH resource. To provide this at step 350, the eNB determines whether a new RNTI should be used.

If the eNB determines that a new RNTI should be used, the eNB may at step 352 define a new group RNTI (G-RNTI) to address the desired group of UEs. In one embodiment, the eNB then scrambles the CRC of the DCI message using the G-RNTI to address the intended group of UEs. The CRC may be used in one embodiment by the corresponding UEs configured with the G-RNTI for data scheduling.

If the eNB determines that a new group RNTI is not to be defined, at step 354 the eNB may define a bit field as a part of the DCI scheduling transmission. In one embodiment, each bit in the bit field may represent a resource block in the unlicensed carrier and/or UE. In one embodiment, one or more additional bits can be added to the DCI format being used, or one or more existing bits may be replaced in the existing field. Depending on the format, a 0 or 1 may be used to indicate whether the corresponding resource block or UE is scheduled using the DCI information.

Whether or not a G-RNTI is defined, at step 356, the eNB may transmit the data signal schedule to the UEs on the unlicensed band. The eNB may transmit the data signals to the desired UE on the unlicensed band using the schedule. In one embodiment, the schedule may indicate that the data signals are to be transmitted in consecutive subframes or in non-consecutive subframes. For example, the schedule may indicate that the data signals are to be e transmitted periodically (e.g., every n subframes). In another embodiment, the schedule may indicate that sets of the data signals are to be transmitted periodically (e.g., x reference signals over x consecutive subframes every n subframes).

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An enhanced NodeB (eNB) comprising:
a transceiver configured to transmit signals to and receive signals from a user equipment (UE) on a carrier in a licensed band and a carrier in an unlicensed band; and
processing circuitry configured to:
cause the transceiver to transmit, to the UE, a trigger signal in one of the unlicensed or licensed band, the trigger signal configured to inform the UE of transmission of an aperiodic reference signal from the eNB to the UE in the unlicensed band using one of a Physical Downlink Control Channel (PDCCH), Enhanced Physical Downlink Control Channel (EPDCCH), Media Access Control Control Element (MAC-CE), or a Radio Resource Control (RRC) message in the one of the unlicensed or licensed band, wherein the one of the PDCCH or EPDCCH indicating the trigger signal is scrambled using a Radio Network Temporary Identifier (RNTI) that is different from a RNTI of a PDCCH or EPDCCH that does not indicate the trigger signal;
cause the transceiver to transmit, to the UE, the aperiodic reference signal in the unlicensed band in addition to transmitting periodic reference signals in one of the unlicensed or licensed band, the aperiodic reference signal including one of a cell-specific reference signal (CRS), a Channel Quality Indication (CQI), a channel state information reference signal (CSI-RS), or a Discovery Reference Signal (DRS); and
cause the transceiver to receive, from the UE, measurements of at least one of a channel quality and channel estimate based on the aperiodic reference signal,
wherein when the trigger signal corresponds to multiple aperiodic reference signals, the processing circuitry is configured to cause the transceiver to use an activation message to trigger the start of transmission of the aperiodic reference signals and use a deactivation message to trigger termination of transmission of the aperiodic reference signals, and the multiple aperiodic reference signals are transmitted periodically over a plurality of consecutive subframes.

2. The eNB of claim 1, wherein:
the processing circuitry is configured to cause the transceiver to transmit the trigger signal N subframes prior to transmission of the aperiodic reference signal, where N is a non-negative integer.

3. The eNB of claim 1, wherein the processing circuitry is configured to:

cause the transceiver to transmit, to the UE, a second trigger signal in one of the unlicensed or licensed band, the second trigger signal configured to inform the UE of a data transmission from the eNB to the UE in the unlicensed band, the data transmission able to be transmitted in a different subframe than the aperiodic reference signal; and
cause the transceiver to transmit, to the UE, the data transmission from the eNB to the UE in the unlicensed band.

4. The eNB of claim 3, wherein the processing circuitry is configured to cause the transceiver to transmit at least one of:
the second trigger signal prior to the trigger signal,
the aperiodic reference signal prior to the data transmission, or
the aperiodic reference signal and the data transmission in the same subframe.

5. The eNB of claim 1, wherein:
the trigger signal is further configured to inform the UE of a data transmission from the eNB to the UE in the unlicensed band, the data transmission able to be transmitted in a different subframe than the aperiodic reference signal.

6. The eNB of claim 1, wherein the processing circuitry is further configured to:
cause the transceiver to transmit, to a plurality of UEs including the UE, scheduling information in one of the unlicensed or licensed band, the scheduling information configured to inform the UEs of at least one data transmission from the eNB to the UEs in the unlicensed band, wherein the scheduling information includes scheduling for a plurality of physical resource blocks using a single PDCCH or EPDCCH resource.

7. The eNB of claim 1, wherein the processing circuitry is further configured to:
cause the transceiver to transmit, to a plurality of UEs including the UE, scheduling information in one of the unlicensed and licensed band, the scheduling information configured to inform the UEs of at least one data transmission from the eNB to the UEs in the unlicensed band, wherein the scheduling information includes Downlink Control Information (DCI) having an M-bit field, wherein each bit of the M-bit field represents a physical resource block in the unlicensed carrier.

8. The eNB of claim 1, wherein the processing circuitry is further configured to:
cause the transceiver to transmit, to a plurality of UEs including the UE, scheduling information in one of the unlicensed and licensed band, the scheduling information configured to inform the UEs of at least one data transmission from the eNB to the UEs in the unlicensed band, wherein the scheduling information includes Downlink Control Information (DCI) having an M-bit field, where each bit of the M-bit field represents an individual UE.

9. The eNB of claim 1, wherein the processing circuitry is further configured to:
cause the transceiver to transmit, to a plurality of UEs including the UE, scheduling information in one of the unlicensed or licensed band, the scheduling information configured to inform the UEs of at least one data transmission from the eNB to the UEs in the unlicensed band, wherein the scheduling information uses the EPDCCH having Downlink Control Information (DCI) scrambled using the RNTI configured to identify the plurality of UEs.

10. The eNB of claim 1, wherein the trigger signal is configured to indicate to the UE transmission of the aperiodic reference signal on the carrier in the unlicensed band to permit the UE to take measurements of the aperiodic reference signal, even when the UE is unable to take measurements of non-aperiodic reference signals provided from the eNB on the carrier in the unlicensed band due to use of the carrier in the unlicensed band by the UE or WiFi devices proximate to the UE when the non-aperiodic reference signals are provided by the eNB, to permit coexistence between the UE and the WiFi devices.

11. The eNB of claim 1, further comprising:
an antenna configured to transmit the trigger signal from the transceiver to the UE.

12. The eNB of claim 1, wherein:
timing of transmission of the aperiodic reference signal with respect to the trigger signal is indicated in the trigger signal.

13. The eNB of claim 1, wherein the processing circuitry is further configured to cause the transceiver to:
transmit to the UE a mix of trigger signals of which a first trigger signal corresponds to transmission of a single reference signal and a second trigger signal corresponds to transmission of multiple reference signals in different subframes for the UE.

14. The eNB of claim 1, wherein the processing circuitry is further configured to:
select, as the RNTI to scramble the PDCCH or EPDCCH that indicates the trigger signal, a random-access RNTI.

15. The eNB of claim 1, wherein the processing circuitry is further configured to:
select the RNTI to scramble the PDCCH or EPDCCH that indicates the trigger signal free from the use of bits in the PDCCH or EPDCCH to indicate the trigger signal.

16. A user equipment (UE) comprising:
a transceiver configured to transmit signals to and receive signals from an enhanced NodeB (eNB) on a carrier in a licensed band and a carrier in an unlicensed band; and
processing circuitry configured to:
cause the transceiver to receive, from the eNB, a trigger signal in one of the unlicensed or licensed band, the trigger signal configured to inform the UE of transmission of an aperiodic reference signal from the eNB to the UE in the unlicensed band using one of a Physical Downlink Control Channel (PDCCH), Enhanced Physical Downlink Control Channel (EPDCCH), Media Access Control Control Element (MAC-CE), or a Radio Resource Control (RRC) message in the one of the unlicensed or licensed band, wherein the one of the PDCCH or EPDCCH indicating the trigger signal scrambled using a Radio Network Temporary Identifier (RNTI) that is different from a RNTI of a PDCCH or EPDCCH that does not indicate the trigger signal, the aperiodic reference signal including one of a cell-specific reference signal (CRS), a Channel Quality Indication (CQI), a channel state information reference signal (CSI-RS), or a Discovery Reference Signal (DRS);
cause the transceiver to receive, from the eNB, the aperiodic reference signal in the unlicensed band in addition to receiving periodic reference signals in one of the unlicensed and licensed band;
perform measurements of at least one of a channel quality and channel estimate based on the aperiodic reference signal; and
cause the transceiver to transmit, to the eNB, the measurements based on the aperiodic reference signal,
wherein when the trigger signal corresponds to multiple aperiodic reference signals, the processing circuitry is configured to cause the transceiver to receive an activation message configured to indicate the start of transmission of the aperiodic reference signals and a deactivation message configured to indicate termination of transmission of the aperiodic reference signals, and the multiple aperiodic reference signals are transmitted periodically over a plurality of consecutive subframes.

17. The UE of claim 16, wherein:
the processing circuitry is configured to cause the transceiver to receive the trigger signal N subframes prior to reception of the aperiodic reference signal, where N is a non-negative integer.

18. The UE of claim 16, wherein the processing circuitry is configured to:
cause the transceiver to receive, from the eNB, a second trigger signal in one of the unlicensed and licensed band, the second trigger signal configured to inform the UE of a data transmission from the eNB to the UE in the unlicensed band; and
cause the transceiver to receive, from the eNB, the data transmission from the eNB to the UE in the unlicensed band, the data transmission able to be transmitted in a different subframe than the aperiodic reference signal.

19. The UE of claim 18, wherein the processing circuitry is configured to cause the transceiver to receive at least one of:
the second trigger signal prior to the trigger signal, the aperiodic reference signal prior to the data transmission, or the aperiodic reference signal and the data transmission in the same subframe.

20. The UE of claim 16, wherein:
the trigger signal is further configured to inform the UE of a data transmission from the eNB to the UE in the unlicensed band, the data transmission able to be transmitted in a different subframe than the aperiodic reference signal.

21. A method of communicating using a licensed and unlicensed band, the method comprising:
transmitting a trigger signal from an enhanced NodeB (eNB) to at least one user equipment (UE) on a carrier in one of the licensed or unlicensed band, the trigger signal configured to inform the at least one UE of transmission of at least one of an aperiodic reference signal or data transmission from the eNB to the at least one UE in the unlicensed band using one of a Physical Downlink Control Channel (PDCCH), Enhanced Physical Downlink Control Channel (EPDCCH), Media Access Control Control Element (MAC-CE), or a Radio Resource Control (RRC) message in the one of the unlicensed or licensed band, wherein the one of the PDCCH or EPDCCH indicating the trigger signal is scrambled using a Radio Network Temporary Identifier (RNTI) that is different from a RNTI of a PDCCH or EPDCCH that does not indicate the trigger signal, the aperiodic reference signal including one of a cell-specific reference signal (CRS), a Channel Quality Indication (CQI), a channel state information reference signal (CSI-RS), or a Discovery Reference Signal (DRS);
transmitting, to the at least one UE, the at least one of the aperiodic reference signal or data transmission from the eNB to the at least one UE in the unlicensed band at the time indicated in the trigger signal; and in response to transmission, to the at least one UE, of the aperiodic reference signal, receiving measurements of at least one of a channel quality and channel estimate based on the aperiodic reference signal, wherein when the trigger signal corresponds to multiple aperiodic reference signals, the method further comprises transmitting an activation message configured to indicate the start of transmission of the aperiodic reference signals and a deactivation message configured to indicate termination of transmission of the aperiodic reference signals, and the multiple aperiodic reference signals are transmitted periodically over a plurality of consecutive subframes.

22. The method of claim 21, wherein the trigger signal is configured to inform the at least one UE of transmission of both the aperiodic reference signal and data transmission, the data transmission able to be transmitted in a different subframe than the aperiodic reference signal.

23. The method of claim 21, wherein:

the trigger signal is configured to inform the at least one UE of transmission of the aperiodic reference signal from the eNB to the at least one UE in the unlicensed band, and the method further comprises:

transmitting a second trigger signal from the eNB to the at least one UE on the carrier in the licensed band, the second trigger signal configured to inform the at least one UE of transmission of the data transmission from the eNB to the at least one UE in the unlicensed band, the data transmission able to be transmitted in a different subframe than the aperiodic reference signal; and transmitting, to the at least one UE, the data transmission from the eNB to the at least one UE in the unlicensed band at the time indicated in the second trigger signal.

24. The method of claim 23, wherein relative timing of the transmission of the aperiodic reference signal and data transmission is independent of relative timing of the trigger signal and second trigger signal.

25. The method of claim 21, further comprising:

identifying, using the RNTI, a plurality of UEs to which to transmit, via the unlicensed band, data transmissions using the EPDCCH;

scrambling scheduling information of the data transmissions using the RNTI; and transmitting the scheduling information to the UEs using the licensed band.

26. A non-transitory computer-readable storage medium that stores instructions for execution by one or more processors of an enhanced NodeB (eNB) the one or more processors to configure a transceiver of the eNB to communicate with a License Assisted Access (LAA) user equipment (UE) operating in an unlicensed band, the eNB to:

transmit a trigger signal to the UE on a carrier in the licensed band, the trigger signal configured to inform the UE of transmission of at least one of an aperiodic reference signal or data transmission from the eNB to the at least one UE in the unlicensed band using one of a Physical Downlink Control Channel (PDCCH), Enhanced Physical Downlink Control Channel (EPDCCH), Media Access Control Control Element (MAC-CE), or a Radio Resource Control (RRC) message, wherein the one of the PDCCH or EPDCCH indicating the trigger signal is scrambled using a Radio Network Temporary Identifier (RNTI) that is different from a RNTI of a PDCCH or EPDCCH that does not indicate the trigger signal;

transmit, to the UE, the at least one of the aperiodic reference signal or data transmission from the eNB to the UE in the unlicensed band at the time indicated in the trigger signal, the aperiodic reference signal including one of a cell-specific reference signal (CRS), a Channel Quality Indication (CQI), a channel state information reference signal (CSI-RS), or a Discovery Reference Signal (DRS); and in response to transmission, to the UE, of the aperiodic reference signal, receive measurements of at least one of a channel quality and channel estimate based on the aperiodic reference signal, wherein when the trigger signal corresponds to multiple aperiodic reference signals, the one or more processors further configure the transceiver to transmit an activation message configured to indicate the start of transmission of the aperiodic reference signals and a deactivation message configured to indicate termination of transmission of the aperiodic reference signals, and the multiple aperiodic reference signals are transmitted periodically over a plurality of consecutive subframes.

27. The non-transitory computer-readable storage medium of claim 26, wherein the trigger signal is configured to inform the UE of transmission of both the aperiodic reference signal and data transmission, the data transmission able to be transmitted in a different subframe than the aperiodic reference signal.

* * * * *